(12) United States Patent
Yamaguchi et al.

(10) Patent No.: US 8,481,856 B2
(45) Date of Patent: Jul. 9, 2013

(54) VEHICLE WIRING STRUCTURE

(75) Inventors: Hiroo Yamaguchi, Saitama (JP); Harumi Takedomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 13/131,012

(22) PCT Filed: Dec. 3, 2009

(86) PCT No.: PCT/JP2009/006600
§ 371 (c)(1),
(2), (4) Date: May 24, 2011

(87) PCT Pub. No.: WO2010/070833
PCT Pub. Date: Jun. 24, 2010

(65) Prior Publication Data
US 2011/0232958 A1    Sep. 29, 2011

(30) Foreign Application Priority Data
Dec. 18, 2008  (JP) .................................. 2008-322891

(51) Int. Cl.
| | |
|---|---|
| H01B 7/18 | (2006.01) |
| H01R 9/05 | (2006.01) |
| H01B 3/30 | (2006.01) |
| H01B 7/00 | (2006.01) |
| B60L 1/00 | (2006.01) |
| B60K 1/00 | (2006.01) |

(52) U.S. Cl.
USPC ................. 174/102 R; 174/75 C; 174/110 R; 174/113 R; 174/103; 307/10.1; 180/65.1

(58) Field of Classification Search
USPC ................. 180/65.1; 174/102 R, 103, 105 R, 174/106 R, 113 R, 128.2, 5 C, 78, 110 R, 174/120 R, 135; 307/10.1
See application file for complete search history.

(56) References Cited

U.S. PATENT DOCUMENTS
4,214,147 A * 7/1980 Kraver ......................... 392/468
2004/0099427 A1   5/2004 Kihira
(Continued)

FOREIGN PATENT DOCUMENTS
| JP | 9-267734 A | 10/1997 |
|---|---|---|
| JP | 2005-218189 A | 8/2005 |

(Continued)

OTHER PUBLICATIONS

European Search Report dated Apr. 5, 2012 issued in counterpart European Application No. 09833143.2.

*Primary Examiner* — Hoa C Nguyen
*Assistant Examiner* — Binh Tran
(74) *Attorney, Agent, or Firm* — Arent Fox LLP

(57) ABSTRACT

Disclosed is a vehicle wiring structure that uses a power cable to connect a power source and an electrical load disposed, inside a vehicle, with a space therebetween in the vehicle front-to-back direction. The vehicle wiring structure is provided with a metal pipe (20) which is disposed on vehicle floor under surface (61), between a position below where the power source is installed and a position below where the electrical load is installed, and two ends of which are inserted into the vehicle, and a power cable that is inserted through the metal pipe (20) and connects the power source and the electrical load. The metal pipe (20) is provided slanting from the two ends toward a bottommost part (21), in the vertical direction, and the bottommost part (21) is heated by heat released from CAT (51).

3 Claims, 4 Drawing Sheets

U.S. PATENT DOCUMENTS

2008/0066886 A1* 3/2008 Mabuchi et al. ............... 165/67
2009/0308632 A1 12/2009 Watanabe

FOREIGN PATENT DOCUMENTS

| | | | |
|---|---|---|---|
| JP | 2005-306104 A | | 11/2005 |
| JP | 2006-303376 A | | 11/2006 |
| JP | 2007-8423 A | | 1/2007 |
| JP | 2007008423 A | * | 1/2007 |
| WO | WO 2005/102759 A1 | | 11/2005 |
| WO | WO 2007/032391 A1 | | 3/2007 |
| WO | WO 2007/004674 A1 | | 11/2007 |

* cited by examiner

VEHICLE WIRING STRUCTURE

CROSS-REFERENCE TO RELATED APPLICATION

This application is a National Stage entry of International Application No. PCT/JP2009/006600, having an international filing date of Dec. 3, 2009; which claims priority to Japanese Application No.: 2008-322891, filed Dec. 18, 2008, the disclosure of each of which is hereby incorporated in its entirety by reference.

TECHNICAL FIELD

The present invention relates to a wiring structure for a vehicle to connect between a power source and an electrical load equipped in a vehicle by a power cable.

BACKGROUND ART

Conventionally, for example, in a hybrid vehicle having an engine and a motor as a driving source, there is known a vehicle wiring structure for connecting between the motor disposed in the engine room in the front portion of the vehicle and the battery or PDU (Power Drive Unit) provided in the vicinity of the trunk room in the rear portion of the vehicle, by a power cable which is inserted through a metal pipe disposed in the under surface of the floor of the vehicle (for example, refer to Japanese Patent Laid-Open Publication No. 2005-218189).

SUMMARY OF THE INVENTION

Problems to be Solved by the Invention

As described above, in case of wiring by using a metal pipe, there are cases where the metal pipe is rusted (be electrically corrosive) due to dew condensation formed inside the metal pipe. In order to prevent this, it is necessary to take countermeasures to provide surface treatment to the inner surface of the metal pipe such as coating or the like, or to use a metal pipe using materials having high durability against rust, or the like. However, these countermeasures cause cost increase of the metal pipe.

In this regard, it is the object of the present invention to provide a vehicle wiring structure which prevents the metal pipe from rusting due to dew condensation formed inside the metal pipe in which the power cable is inserted through, in a suppressed cost.

Means for Solving the Problems

The present invention was made to fulfill the above object and relates to a vehicle wiring structure which uses a power cable to connect between a power source and an electrical load disposed, inside a vehicle, with a space therebetween in a vehicle front-to-back direction, comprising a metal pipe disposed on vehicle floor under surface between a position below where the power source is installed and a position below where the electrical load is installed, and two ends thereof are inserted into the vehicle, and a power cable inserted through an inside of the metal pipe and which connects the power source and the electrical load.

Moreover, the present invention is characterized in that the metal pipe is provided slanting from the two ends toward a bottommost part, in the vertical direction, and comprising a heating unit to heat the bottommost part.

According to the present invention, the dew condensation formed inside the metal pipe flows towards the bottommost part in the vertical direction of the metal pipe. Since the bottommost part is being heated by the heating unit, the dew condensation reaching the vicinity of the bottommost part is heated and evaporated. Therefore, it is able to prevent the metal pipe from rusting due to dew condensation. Further, in such case, there is no need to take countermeasures of coating in order to prevent the metal pipe from rusting or using materials with high durability against rust, or the like, thereby being able to suppress the cost of the metal pipe.

Moreover, the present invention is characterized in that the heating unit is an exhaust pipe of an engine installed in the vehicle, and a part including the bottommost part of the metal pipe and the exhaust pipe is proximately disposed within a recessed portion formed in the vehicle floor undersurface.

According to the present invention, it is able to evaporate dew condensation reaching the vicinity of the bottommost part of the metal pipe by effectively using the heat radiation from the exhaust pipe without additionally providing a heating unit.

Moreover, the present invention is characterized in that the heating unit is an electric heater provided at the bottommost part of the metal pipe.

According to the present invention, it is able to evaporate dew condensation reaching the vicinity of the bottommost part of the metal pipe by effectively heating the bottommost part of the metal pipe by the electric heater provided at the bottommost part.

Moreover, the present invention is characterized in that at least one end of the metal pipe is released to air.

According to the present invention, the evaporated moisture heated by the heating unit can be discharged from the end part of the metal pipe by having at least one end of the metal pipe being released to air. Therefore, it is able to prevent the evaporated moisture from condensing again.

Moreover, the present invention is characterized in that a plurality of power cables are provided inside the metal pipe, and at least one end of the metal pipe is released to air through a space between the plurality of power cables, and then is covered by a covering member.

According to the present invention, it is able to release to air at least one end of the metal pipe through the space between the plurality of power cables, and then retain the plurality of power cables at the end part of the metal pipe.

BEST MODE FOR CARRYING OUT THE INVENTION

Figure 1:
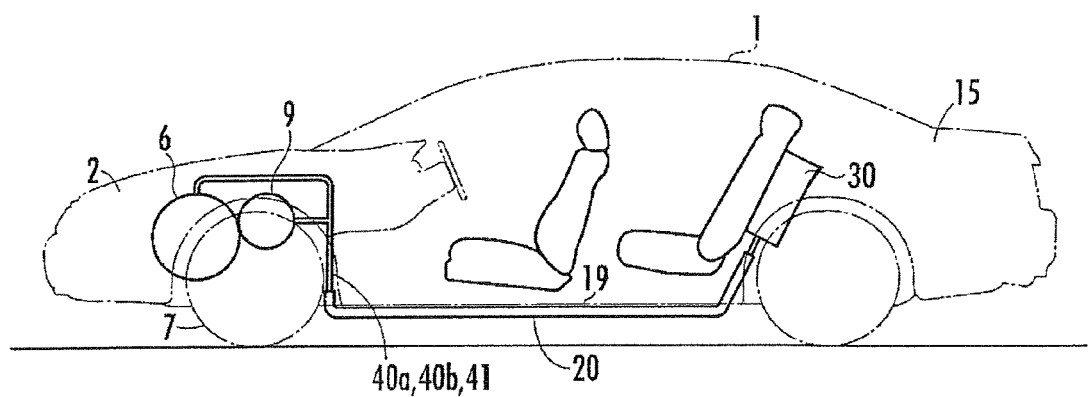
FIG. 1 A configuration diagram of a vehicle wiring structure of the present invention applied to a hybrid vehicle.

An embodiment of the present invention will be explained referring to FIGS. 1 to 5. FIG. 1 is a configuration diagram of a vehicle wiring structure of the present invention applied to a hybrid vehicle, and FIG. 2 is a configuration diagram of main parts of the hybrid vehicle shown in FIG. 1.

Figure 2:
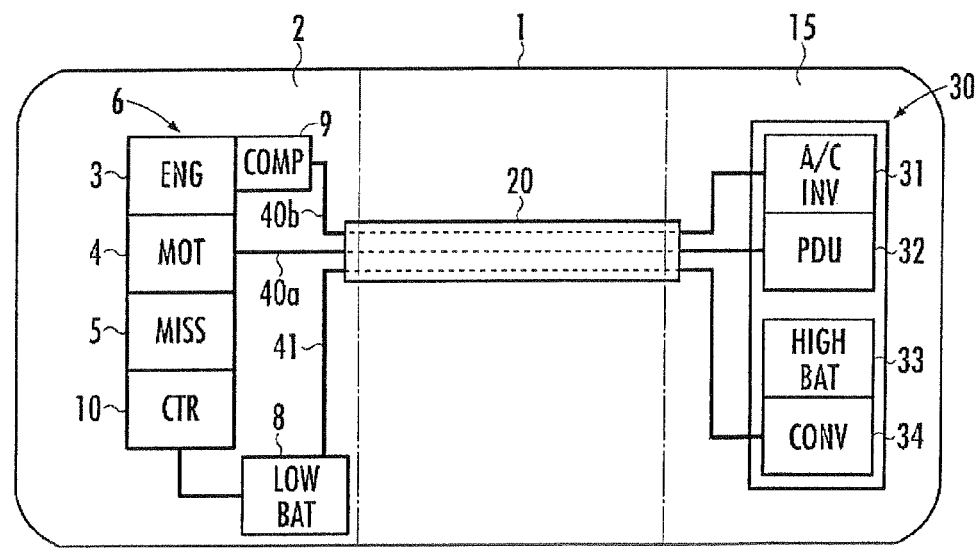
FIG. 2 A configuration diagram of main parts of the hybrid vehicle shown in FIG. 1.
Figure 3:
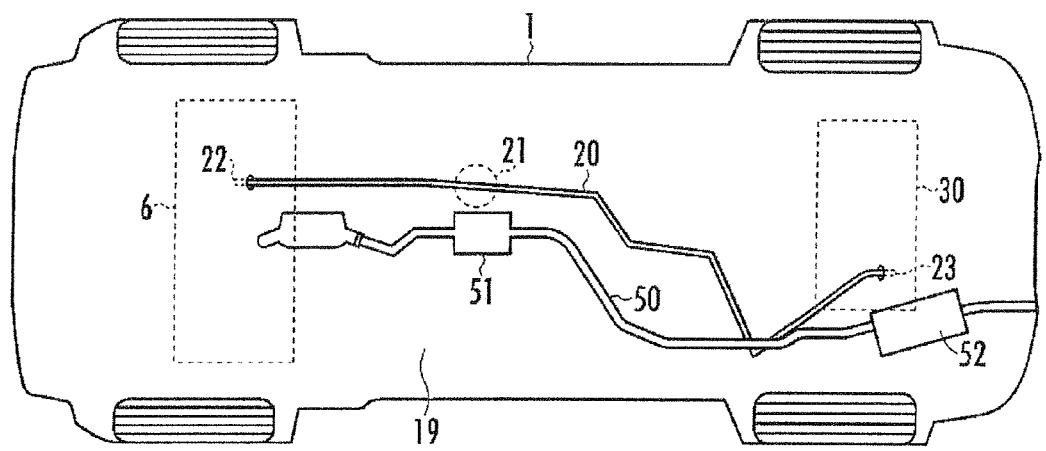
FIG. 3 A configuration diagram of floor undersurface of the hybrid vehicle, and a cross-section diagram of the metal pipe inserted with the power cables.
Figure 3:
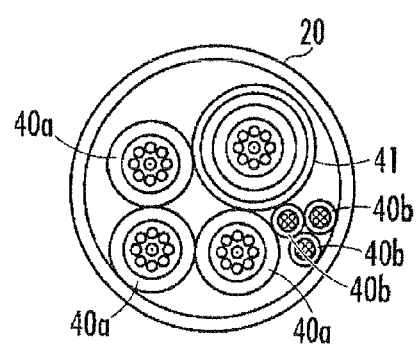
Figure 4:
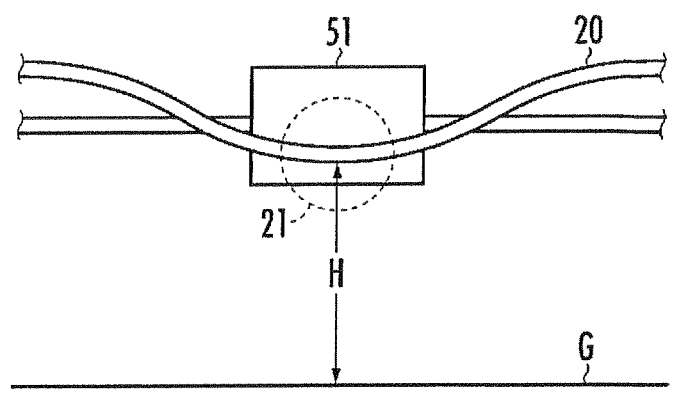
FIG. 4 An explanatory diagram of an embodiment showing the alignment of the metal pipe and the CAT.
Figure 4:
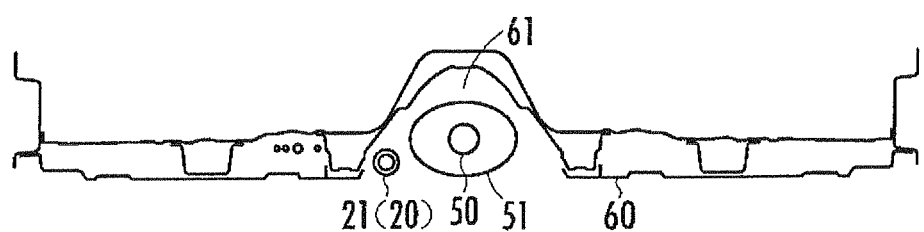
Figure 5:
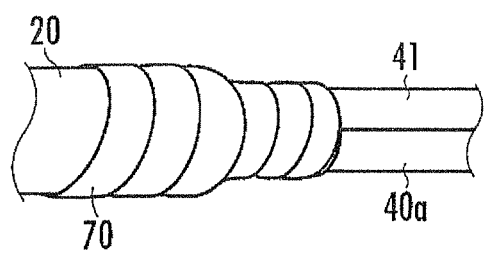
FIG. 5 An explanatory diagram of the treatment at the end part of the metal pipe.
Figure 5:
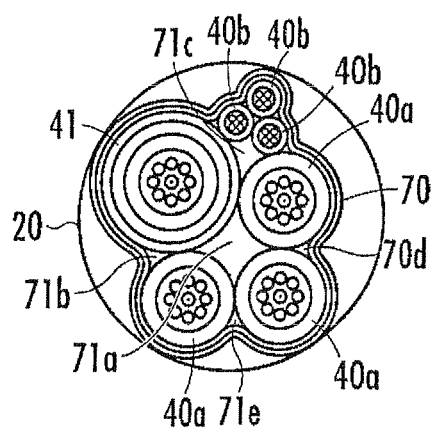

Referring to FIGS. 1 and 2, a power unit 6 comprising an engine 3, a motor generator 4 (which corresponds to the electrical load of the present invention), an automatic transmission 5, an electric compressor 9 for an air-conditioning unit 9 (which corresponds to the electrical load of the present invention), a low voltage battery 8, and a controller 10 for controlling the operation and the like of the engine 3, is disposed in an engine room 2 at the vehicle front portion of the hybrid vehicle 1.

The motor generator 4 is a three-phase DC brushless motor, and the driving force of the motor generator 4 and the engine 3 is transmitted to a front wheel 7, which is the drive wheel, via the automatic transmission 5. Furthermore, when the speed of the hybrid vehicle 1 is reduced and the like, the driving force is transmitted from the front wheel 7 to the motor generator 4, and the motor generator 4 functions as the power generator. Then, the generated electric power of the motor generator 4 is collected at a high voltage battery 33 via a motor inverter 32.

The electric compressor 9 is provided with a compressor motor (not illustrated), and the driving shaft of the compressor motor is linkable with the crankshaft of the engine 3. The compressor motor is a three-phase motor, and electric power is provided to the compressor motor from a compressor inverter 31.

An electric unit 30 (which corresponds to the power source of the present invention) is disposed in a trunk room 15 at the rear portion of the hybrid vehicle 1. The motor inverter 32 for a rotational control of the motor generator 4, the compressor inverter 31 for a rotational control of the electric compressor 9, the high voltage battery 33, and a DC/DC converter 34 for depressing the output voltage of the high voltage battery 33, is housed in the electric unit 30.

The motor inverter 32 converts the direct current electricity provided form the high voltage battery 33 to a three-phase alternating current electricity and drives the motor generator 4. Furthermore, the compressor inverter 31 also converts the direct current electricity provided form the high voltage battery 33 to a three-phase alternating current electricity and drives the compressor 9.

The motor generator 4 and the motor inverter 32 are connected by a three-phase power cable 40a for the motor. Similarly, the compressor 9 and the compressor inverter 31 are connected by a three-phase power cable 40b for the compressor. Furthermore, the DC/DC converter 34 and the low voltage battery 8 are connected by a low voltage power cable 41 for providing electric power used for the operation of the controller or the like and for charging the low voltage battery 8.

At the undersurface of a floor 19 of the hybrid vehicle 1, there is disposed a metal pipe 20 with its one end inserted in the engine room 2 and the other end inserted in the trunk room 15. And the power cable 40a for the motor, the power cable 40b for the compressor, and the low voltage power cable 41 are inserted through the metal pipe 20, thereby connecting between the power unit 6 of the engine room 2 and the electric unit 30 of the trunk room 15.

FIG. 3(a) shows the configuration of the undersurface of the floor 19 of the hybrid vehicle 1, wherein one of the end part 22 of the metal pipe 20 is inserted to reach the vicinity of the power unit 6 disposed in the engine room 2, and the other end part 23 is inserted to reach the vicinity of the electric unit 30 disposed in the trunk room 15.

Furthermore, an exhaust pipe 50 of the engine 3 is disposed at the floor undersurface 19, and the bottommost part 21 of the metal pipe 20 in the vertical direction is arranged at a position adjacent to an exhaust gas purification CAT 51 (catalyzer, catalyst) provided at a point along the exhaust pipe 50. In addition, a muffler 52 is provided at a rear position of the exhaust pipe 50.

FIG. 3(b) is a cross-section diagram of the metal pipe 20, and as described above, the metal pipe 20 is inserted with the power cable 40a for the motor, the power cable 40b for the compressor, and the low voltage power cable 41.

Next, referring to FIG. 4(a), the metal pipe 20 is provided slanting from the two ends to the bottommost part 21 (a part where the height H from the ground surface G is lowest) in the vertical direction. Therefore, the dew condensation formed within the metal pipe 20 flows towards the bottommost part 21. And since the CAT 51 is disposed adjacent to the bottommost part 21 of the metal pipe 20, the dew condensation flown to the bottommost part 21 is heated by the heat radiation from the CAT 51 and evaporated.

Therefore, it is able to prevent the metal pipe 20 form rusting by the dew condensation formed in the metal pipe 20 being remained in the metal pipe 20. In this case, the CAT 51 corresponds to the heating unit of the present invention.

And then, since the moisture evaporated at the bottommost part 21 is discharged from both ends of the metal pipe 20 which is released to air, it is able to prevent the evaporated moisture from condensing again in the metal pipe 20. Furthermore, FIG. 4(b) is a longitudinal sectional view of the place where the CAT 51 is disposed, and the bottommost part 21 of the metal pipe 20 is housed together with the exhaust pipe 50 and the CAT 51 within the concaved groove 61 formed to dispose the exhaust pipe 50 and the CAT 51 at the floor undersurface 60. By this, the bottommost part 21 of the metal pipe 20 and the CAT 51 are arranged adjacently.

As shown in FIG. 5(a), the end part of the metal pipe 20 may be covered with a covering member such as a tape 70 or a corrugated tube or the like, in order to retain a plurality of power cables. In such case, as shown in FIG. 5(b), the evaporated moisture is released from spaces 71a, 71b, 71c, 71d, and 71e between the power cables.

Furthermore, in the present embodiment, although the CAT 51 provided at the exhaust pipe 50 of the engine 3 is used as the heating unit of the present invention, alternatively a muffler 52 provided at the exhaust pipe 50 may be used, or an electric heater (also labeled 51)for heating the bottommost part of the electric pipe 20 may be provided.

Industrial Application

As described above, according to the vehicle wiring structure of the present invention, the metal pipe in which the power cable is inserted, is prevented from rusting by dew condensation, and therefore it is useful for vehicle wiring.

The invention claimed is:

1. A vehicle wiring structure which uses a power cable to connect between a power source and an electrical load disposed, inside a vehicle, with a space therebetween in a vehicle front-to-back direction, comprising:

a metal pipe disposed on a vehicle floor undersurface between a position below where the power source is installed and a position below where the electrical load is installed, and two ends thereof are inserted into the vehicle; and the power cable being inserted through an inside of the metal pipe and which connects the power source and the electrical load;

wherein the metal pipe is provided slanting from the two ends toward a bottommost part in a vertical direction, and wherein a heating unit is provided to heat the metal pipe at the bottommost part;

wherein the heating unit is an exhaust pipe of an engine installed in the vehicle, and wherein a part including the bottommost part of the metal pipe and the exhaust pipe are proximately disposed within a recessed portion formed on the vehicle floor undersurface.

2. The vehicle wiring structure according to claim 1, wherein at least one end of the metal pipe is released to air.

3. The vehicle wiring structure according to claim 1, wherein a plurality of power cables are provided inside the metal pipe, and wherein at least one end of the metal pipe is released to air through a space between the plurality of power cables, and then is covered by a covering member.

\* \* \* \* \*